United States Patent [19]

Vertanen

[11] Patent Number: 5,240,027
[45] Date of Patent: Aug. 31, 1993

[54] COMBINATION RELIEF VENT AND CLOSURE APPARATUS

[75] Inventor: Mark W. Vertanen, Creston, Iowa

[73] Assignee: Gits Manufacturing Company, Creston, Iowa

[21] Appl. No.: 998,562

[22] Filed: Dec. 30, 1992

[51] Int. Cl.$^5$ .............................................. F16K 17/36
[52] U.S. Cl. ...................................... 137/73; 220/203; 220/89.4
[58] Field of Search ............................ 137/72, 73, 74; 220/203, 89.4

[56] References Cited

U.S. PATENT DOCUMENTS

| | | | |
|---|---|---|---|
| 2,271,786 | 2/1942 | Watkins | 137/53 |
| 2,357,620 | 9/1944 | Thomas | 220/89 |
| 2,489,787 | 11/1949 | Knowlton | 220/89 |
| 2,735,443 | 2/1956 | Beck | 137/493.3 |
| 2,822,961 | 2/1958 | Seaquist | 222/397 |
| 3,385,468 | 5/1968 | Fleming et al. | 220/44 |
| 4,325,398 | 4/1982 | Green | 137/73 X |
| 4,457,325 | 7/1984 | Green | 137/73 X |
| 4,458,711 | 7/1984 | Flider | 137/71 |
| 5,031,790 | 7/1991 | Keller | 220/203 |
| 5,165,445 | 11/1992 | Vertanen | 137/493.6 |

OTHER PUBLICATIONS

Girard Equipment Inc., catalog–date and place of publication unknown.
Nalco catalog with enclosures–date and place of publication unknown.
Betts Catalog–date and place of publication unknown.

Primary Examiner—John C. Fox
Attorney, Agent, or Firm—Haverstock, Garrett & Roberts

[57] ABSTRACT

Apparatus which can be installed over an opening on a container and can provide relief of excessive pressure conditions and excessive vacuum conditions in the container and provide rapid temperature actuated pressure relief for the container in the event of fire or other potentially dangerous heat related conditions, the apparatus including an aperture therethrough communicating with the container opening and a member releasable maintained in the aperture with a substance which melts at a predetermined temperature to enable pressure in the container acting against the releasable member to separate and even blow the releasable member from the apparatus and escape from the container through the aperture, the preferred construction including a self-actuating and self-modulating combined pressure and vacuum relief valve assembly which provides accurate pressure relief for the container at a predetermined over pressure condition and high inflow rates of air for vacuum relief at a predetermined excessive vacuum or negative pressure condition, the combined relief valve assembly being mounted on the releasable member.

18 Claims, 4 Drawing Sheets

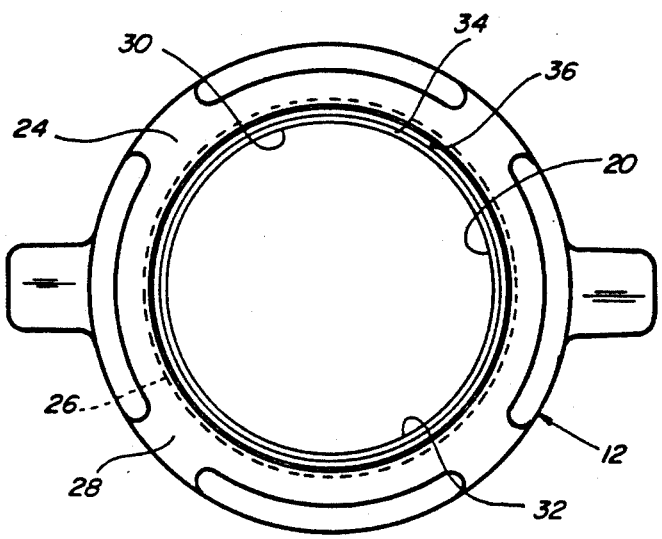
Fig. 3
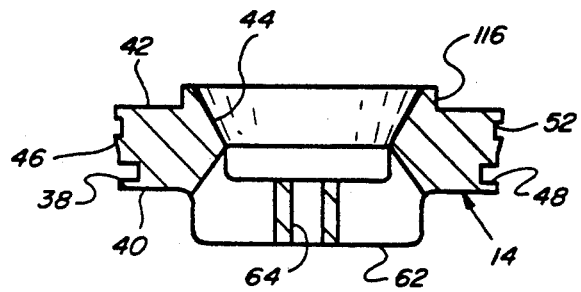
Fig. 4
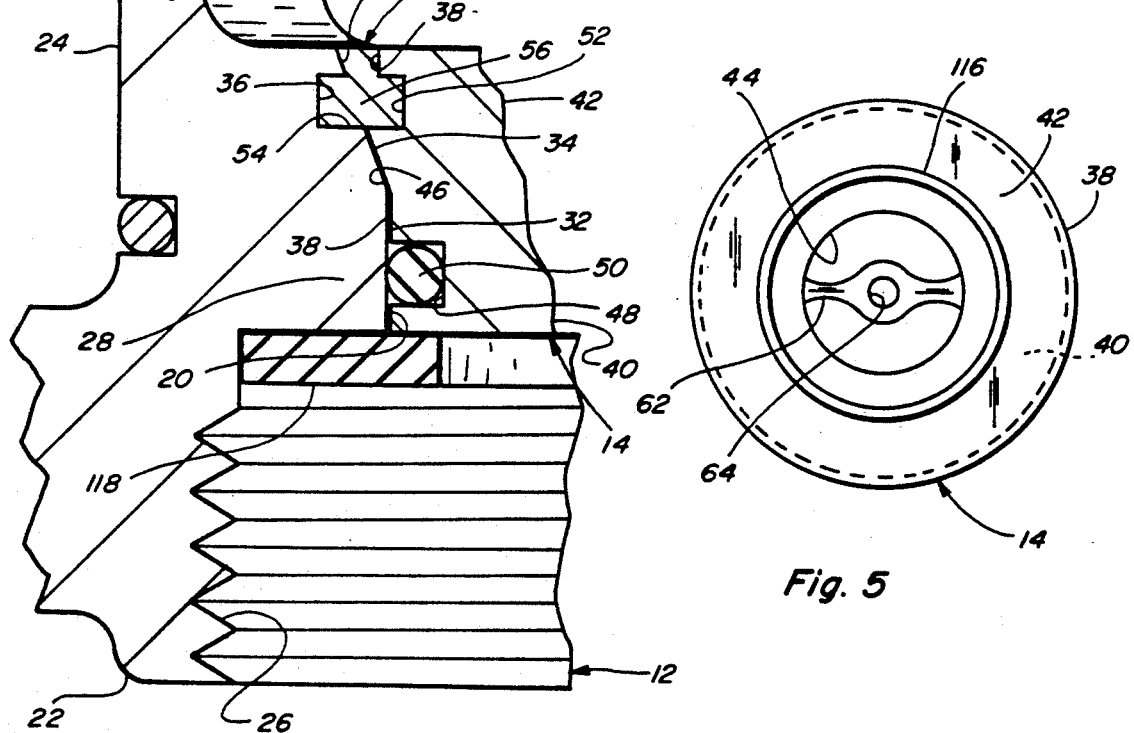
Fig. 6
Fig. 5

COMBINATION RELIEF VENT AND CLOSURE APPARATUS

The present invention relates generally to relief vent devices for containers such as cargo tanks, storage tanks and the like, and more particularly, to a combination relief vent device which mounts as an easily removable cover or cap over an opening on a container and can provide relief of over pressure and excessive vacuum conditions in the container as they occur, and provide rapid temperature actuated pressure relief for the container in the event of fire or other potentially dangerous heat related conditions. The device preferably includes self-actuating and self-modulating pressure and vacuum relief means which are combined according to the teachings of my prior U.S. Pat. No. 5,165,445. The device includes fusible relief means, preferably including a fusible eutectic solder substance, which provide rapid pressure relief at a predetermined temperature and which relief temperature can be precisely selected as desired. Furthermore, the fusible means are located out of communication with the container opening so as not to contaminate the container interior or contents thereof. The device can alternatively include fusible means in combination with pressure relief means only, or with vacuum relief means only, as desired.

BACKGROUND OF THE INVENTION

The chemical, materials handling, and transportation fields preferably require containers having only a minimal number of ports and other openings thereon for safety, cost and other reasons. It is therefore advantageous to provide containers such as cargo and storage tanks and bulk shipping containers having single openings which can be used for multiple purposes such as for filling and cleaning, for venting or relieving normally occurring pressure and vacuum conditions, and also for preventing dangerous pressure build-up in the container in the event of fire and the like. Government regulations can also require tanks, vessels and other containers for the transportation and storage of chemicals and other substances to have means providing prescribed flow rates for pressure and vacuum relief under predetermined pressure conditions, and also means providing temperature actuated pressure relief and depressurization at or above predetermined temperature conditions. Such relief means should be rugged and durable so as to be able to withstand abuse in industrial environments, should operate under severe adverse conditions, and should also be leak-resistant even in the event the container tips or overturns.

The device disclosed in U.S. Pat. No. 5,165,445, referenced above, mounts on or over a single opening or orifice on a container and can provide both pressure relief and vacuum relief for the container through the container opening. Such device, however, provides no means for temperature actuated pressure relief. Furthermore, such device does not include mounting means adapted for replacing container caps and covers and so does not readily facilitate using the same port or opening for alternative purposes such as for filling and cleaning the container.

Numerous other devices attempting to satisfy one or more of the above discussed requirements are also known in the art. Reference is made to U.S. Pat. No. 5,031,790, which discloses a removable vented cap for fuel tanks including a self-actuating valve for pressure relief, an open vent for vacuum relief, and fusible plugs for temperature actuated pressure relief. Reference is also made to U.S. Pat. No. 3,385,468, which discloses a safety vent device for mounting over the vent hole of a gasoline tank, which device has passages for pressure and vacuum relief venting and a releasable member held in place with a thin band of fusible alloy to provide emergency pressure relief at a particular temperature. Such prior art devices are limited, however, as they include open passages and fusible means which can leak and allow contamination and such devices may also be damaged if the tank is overturned. Such devices can also expose the interior of a tank and the contents thereof to toxic fusible substances such as a solder substance containing lead alloy or like substances.

Contrasted to the relatively limited prior art devices discussed above, the subject invention relates to a durable and leak-resistant relief vent apparatus which mounts as a removable cover or cap over an opening on a container and can provide pressure relief and vacuum relief for the container at precise predetermined pressure and vacuum conditions and rapid fusible pressure relief at and above a precise predetermined temperature.

SUMMARY OF THE INVENTION

The present invention overcomes many of the shortcomings and limitations associated with known prior art devices and teaches the construction and operation of an improved combination relief vent and closure device with pressure and vacuum relief means which are independently self-actuating and self-modulating and provide pressure relief for the container at predetermined over pressure conditions and provide high inflow rates of vacuum relief at predetermined negative pressure or excessive vacuum conditions. The device includes fusible relief means which melt at a predetermined relatively high temperature to provide rapid pressure relief for the container. The relief temperature can be very precisely controlled and can be selected so as to correspond, for instance, to high temperature conditions such as a fire, which conditions can cause potentially dangerous pressure build-up which can damage the container, its contents or lading, or damage other equipment, or create a risk of explosion. Below the predetermined relief temperature and with the pressure and vacuum relief means closed, the device provides a sealed cap or cover for the container which is durable and leak-resistant even in the event the container is upset or overturned. The device is easily and quickly removable from the container to enable use of the opening as required for alternative purposes such as for filling, cleaning, and otherwise accessing the container interior.

The present device includes an outer housing member having means adjacent one end for removably mounting or installing over a container opening. The outer housing member has an aperture extending therethrough, which aperture is preferably relatively large and is positioned so as to be located directly over the container opening. The device includes a separate inner housing assembly including an inner housing member located over or in the aperture of the outer housing member. The inner housing assembly is releasably maintained in position by the fusible relief means, discussed next. The inner housing member also includes a passageway extending therethrough and through the aperture. The passageway provides a conduit for communicating pressure conditions in the container to the relief means and also acts as a conduit for providing pressure and vacuum relief.

The fusible relief means include a fusible solder substance which releasably maintains the inner housing member in the aperture of the outer housing member when the temperature of the fusible solder is below the predetermined temperature selected for emergency pressure relief. In the preferred constuction, the fusible solder substance forms a solid band or ring member located in an annular channel or void extending around the releasable inner housing member adjacent the free end of the device. The location of the fusible means adjacent the free end of the device and opposite the mounting end importantly enables the fusible means to be exposed to the atmospheric temperature conditions around the container to enable more rapid response by the fusible means to environmental temperature changes and also protects the container interior and contents from exposure and contamination by the fusible means. The channel or void around the releasable inner housing member includes annular grooves or recesses formed into respective radially facing inner and outer sides thereof, which grooves receive portions of the band or ring of solder to maintain the solder band in position in the event the device is deformed, and to enable the ring to securely interlock the inner and outer housing members together. The fusible solder can include any suitable solder substance or alloy, the preferred fusible solder material being a eutectic solder alloy which melts at some desired temperature. For instance, a solder of lead-bismuth alloy having a melting point of 250° F. has been found satisfactory for some applications. Other solder substances having different melting temperatures may also be selected as required. The fusible means can also alternatively include one or more fusible members such as dowel shaped members or the like positioned to hold or wedge the inner housing member over the relief aperture.

The operation of the fusible relief means is simple. In the event the fusible means reach the predetermined relief temperature, the fusible means melt and release the inner housing assembly from the outer housing member. This enables pressure in the container acting against the inner housing member to separate and displace and even blow the inner housing assembly away from the outer housing member to enable the pressure to escape from the container through the aperture.

The present device preferably includes cooperatively engageable means for locating and mounting the inner housing member in the aperture of the outer housing member, which mounting means prevent the inner housing member from passing or being forced through the aperture and into a container on which the device is mounted. The mounting means are located between the fusible solder substance and the mounting end of the device and preferably include an annular tapered surface extending around the aperture of the outer housing member and which cooperatively engages in surface-to-surface relation an oppositely facing annular tapered surface extending around the inner housing member. The surface-to-surface engagement also forms a sealed condition which can act to prevent the fusible solder substance, which can contain substances such as toxic lead alloys and the like, from communicating with the container interior and contaminating the contents thereof.

The device preferably includes second seal means which form a more resilient and flexible sealed condition around the aperture between the respective inner and outer housing members adjacent the mounting end of the device. The second seal means include an O-ring located around the periphery of the inner housing member, which O-ring is compressed against an opposing surface of the outer housing member. This more resilient seal is important as it is sufficiently resilient and flexible to maintain a sealed condition between the respective inner and outer housing members even when subjected to shock and vibration such as when a container is transported, and when the outer housing member is abused or deformed such as due to wrenching actions and hammer blows during installation of the device on a container and removal therefrom. The resilient O-ring seal maintains a sealed condition around the releasable member throughout temperature fluctuations due to, for instance, changing atmospheric conditions and changes in temperature of the container contents. Both the releasable mounting means and the resilient seal means are constructed as shown so as to easily disengage and release the inner housing member in the event the fusible means melt.

The pressure and vacuum relief means form a part of the inner housing assembly and are mounted on the releasable inner housing member in operative relation to the passageway therethrough. The pressure and vacuum relief assemblies are preferably constructed according to the teachings of my prior U.S. Pat. No. 5,165,445 which can be referred to for constructional details. The combined relief assemblies are mounted on a shaft member extending axially through the passageway and through the inner housing member. The pressure relief assembly includes a first movable member or pressure relief valve member which is urged or biased toward a closed position in sealed relation with a valve seat on the inner housing member by biasing means. The pressure relief valve member is movable away or displaceable from the valve seat and against the biasing means to open the passageway when internal container pressures exerts a force against the pressure relief valve member which counteracts and exceeds the force of the biasing means in the usual manner, the displacement of the pressure relief valve member being determined by the amount of pressure in the container acting thereagainst. When the pressure in the container returns to below the predetermined over pressure condition, the pressure relief valve member returns to its closed position.

A second movable member or vacuum relief valve member operates in cooperation with the pressure relief valve assembly for providing vacuum relief. The pressure relief valve member has a vacuum relief passage therethrough and forms a valve seat adjacent to the passage. The vacuum relief valve member is urged or biased towards a closed position in sealed relation with the valve seat on the pressure relief valve member by biasing means. The vacuum relief valve member moves away from the valve seat to open the vacuum relief passage when pressure conditions in the container exceed the predetermined vacuum or negative pressure in the usual manner, the displacement of the vacuum relief valve member depending on the vacuum condition and the vacuum relief valve member returns to its closed position when the excessive vacuum condition has been relieved. To provide a more compact structure, the preferred pressure relief member forms an internal cavity which is open at one end and cooperatively receives the vacuum relief valve member such that the combined pressure and vacuum relief assemblies can have a size about the same as the pressure relief valve alone. The present device can also be alternatively constructed having either a pressure relief assembly only or a vacuum relief assembly only, as desired.

The present device is of rugged construction and can be fabricated from any material suitable for meeting the requirements of a particular application, for instance stainless steel for corrosion resistance, a beryllium alloy for spark resistance, and other materials. The preferred mounting means include a conventional threaded portion such as for threadedly mounting over a fill pipe or other threaded portion of a container in the same manner as a standard cap or cover for the container opening to enable easily and quickly installing and removing the device from a container as required. The outer housing member can include means adjacent the outer surface thereof cooperatively engageable by a wrench or other tool for tightening and loosening the device on a container. For instance, outwardly extending tabs or ears cooperatively engageable by a spanner wrench in the usual manner as for installing and tightening a conventional cover or cap can be used. The outer housing member is constructed so as to resist deformation when being tightened on and removed from a container and includes outwardly extending prominences thereon adjacent the pressure and vacuum relief means for shielding and protecting the pressure and vacuum relief means from damage such as from being struck by fork lifts and from contact with other containers and structures. A cable, chain, cord or other means can optionally be attached between the outer housing member and the container to prevent loss or misplacement when removed from the container opening.

The device can include a bell or cup shaped cover located over the combination pressure and vacuum relief valve assemblies to prevent contaminants such as rain water and dust from entering the relief valve assemblies from the outside, yet which cover enables relatively free passage of air both into and out of the relief valve assembly, as taught in my prior patent referenced above. The inner housing assembly can include a raised lip extending around the opening to the passageway on the outside of the device for preventing rain water and the like from entering the passageway. The device may also include optional shock absorbing and vibration dampening means for protecting the combination pressure and vacuum relief means and for enabling better and smoother operation thereof. Additionally, gasket or other seal means can be located in association with the threaded mounting means for forming a sealed condition around a container opening.

OBJECTS OF THE INVENTION

It is a principal object of the present invention to provide pressure relief, vacuum relief, and fusible pressure relief through means installable in a single opening on a container.

Another object is to provide combination relief means mountable as a removable cap or cover over a container opening.

Another object is to provide a combination relief vent apparatus which forms a sealed closure over a container opening between predetermined upper and lower pressure and temperature conditions.

Another object is to protect storage containers and their contents in the event of fire or explosion.

Another object is to provide a combined relief vent apparatus which is self-actuating and self-modulating to provide pressure relief at predetermined pressure conditions and vacuum relief at predetermined negative or partial vacuum conditions, and which also provides emergency pressure relief when the temperature reaches or exceeds a predetermined temperature.

Another object is to provide a combination relief vent and closure apparatus adaptable for use on a variety of containers.

Another object is to provide a relief vent apparatus including fusible relief means which are durable and leak-resistant.

Another object is to provide a fusible relief vent apparatus which will not contaminate the interior and contents of a container.

Another object is to provide a combination relief vent apparatus which does not leak in the event a container on which it is mounted overturns.

Another object is to provide an apparatus having combined pressure relief, vacuum relief and fusible relief means which is compact and simple in operation.

These and other objects and advantages of the present invention will become appararent to those skilled in the art after considering the following detailed specification of a preferred embodiment in conjunction with the accompanying drawings.

BRIEF DESCRIPTION OF THE DRAWINGS

FIG. 3 is a top plan view of the outer housing member of FIG. 2;

FIG. 4 is a cross-sectional view of the inner housing member of the apparatus of FIG. 1;

FIG. 5 is a top plan view of the inner housing member of FIG. 4;

FIG. 6 is an enlarged fragmentary cross-sectional view of the apparatus of FIG. 1 showing the means for mounting the inner housing assembly on the outer housing member;

DESCRIPTION OF THE PREFERRED EMBODIMENT

Figure 1:
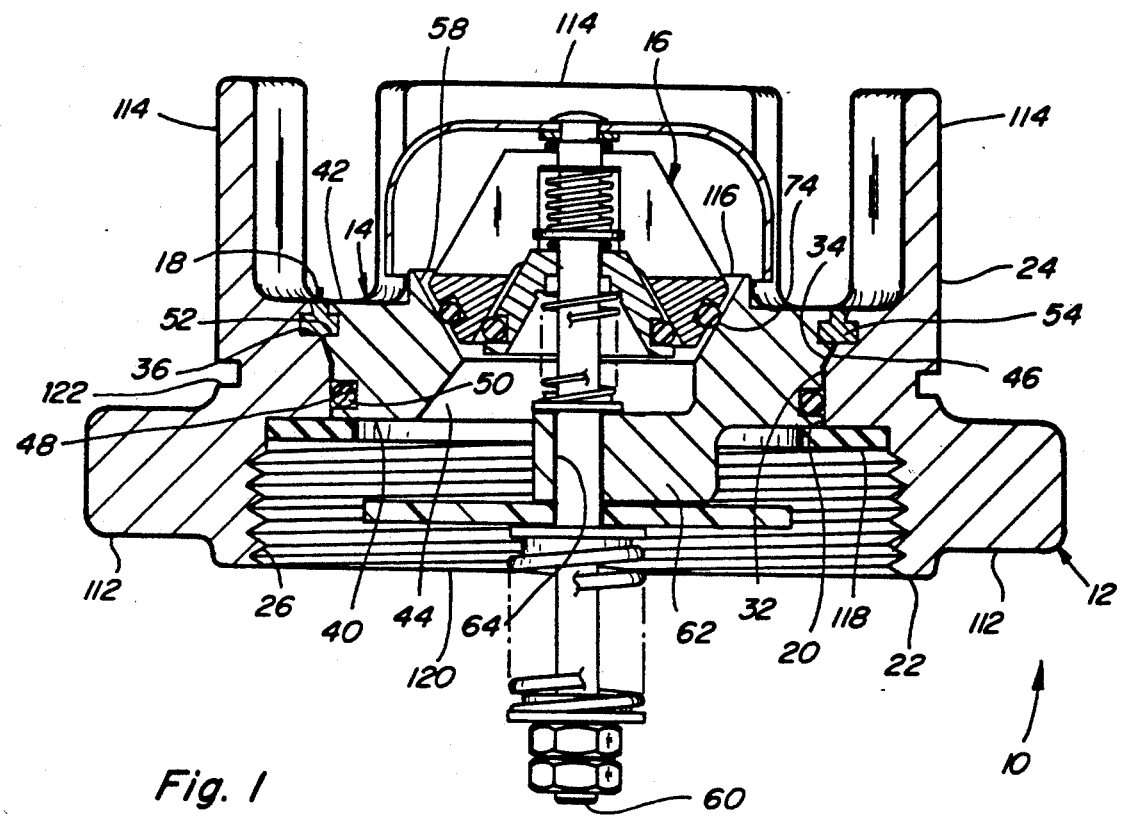
FIG. 1 is a cross-sectional view of a combination relief vent and closure apparatus constructed according to the teachings of the present invention.

Referring to the drawings more particulary by reference numbers, wherein like numerals refer to like parts, number 10 in FIG. 1 refers to a combination relief vent and closure apparatus constructed according to the teachings of the present invention. The relief vent and closure apparatus 10 is adapted for mounting as a cover or cap over a fill hole or other opening on a container such as a storage tank, a cargo tank, a bulk shipping container, or other container. The apparatus 10 provides a sealed closure for a container opening, can relieve over pressure conditions and excessive negative pressure or vacuum conditions in the container through the opening as they occur, and can depressurize and prevent the build up of pressure in the container at or above a selected temperature condition. The device 10 is especially well suited for use on containers wherein the internal pressure and vacuum conditions can vary due to the transfer of product or material into or out of the container or from changes in internal and environmental or atmospheric conditions and the like, and where there is a danger from excessive pressure build-up in the container due to relatively high temperature conditions such as in a fire or heat build-up condition around the container. The device 10 includes an outer housing member 12; a releasable inner housing assembly including an inner housing member 14; combination pressure and vacuum relief means 16; and fusible relief means 18.

Figure 2:
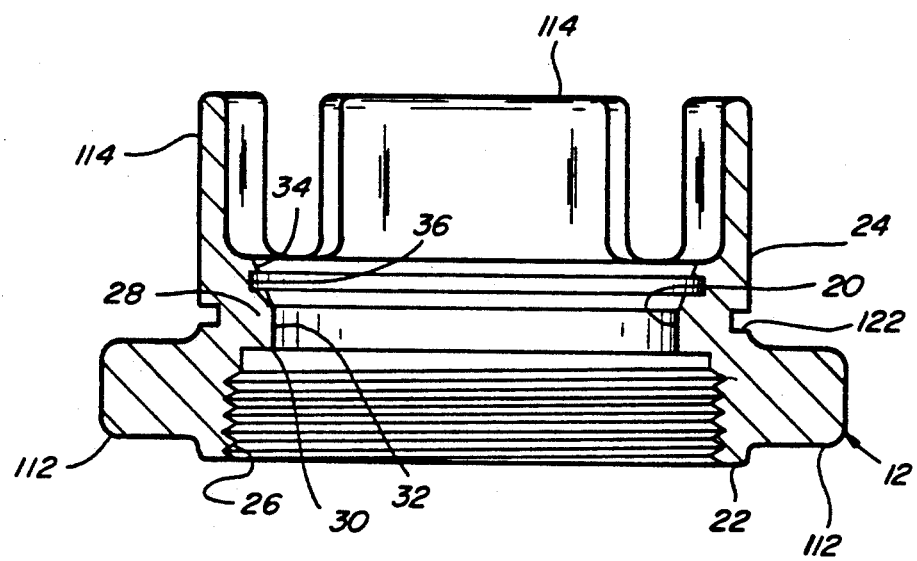
FIG. 2 is a cross-sectional view of the outer housing member of the apparatus of FIG. 1.

The outer housing member 12 of the present device 10 is preferably an annular or cylindrical shaped member defining an opening or aperture 20 extending therethrough between a mounting end 22 and an opposite or free end 24, as shown in FIGS. 2 and 3. Mounting means preferably including a threaded portion 26 are located adjacent the mounting end 22 to enable mounting the device 10 with the aperture 20 located directly over an opening on a container, such as the container 66 shown in FIGS. 7–9. The outer housing member 12 includes means located adjacent to the free end 24 for mounting the inner housing assembly in covering relation to the aperture 20, such mounting means including an annular shaped inner flange 28 extending around the aperture 20. The inner flange 28 includes a radially innermost annular surface 30 which includes a seal portion 32 and a tapered portion 34. The tapered portion 34 forms an annular groove 36 therein, which groove 36 receives the fusible means 18, as discussed below.

The inner housing member 14 has an outer surface 38 extending around the periphery thereof between a first end portion 40 and an opposite or second end portion 42, and a centrally located passageway 44 therethrough as shown in FIGS. 4 and 5. The outer surface 38 has an annular shape and includes a tapered portion 46 sized and shaped for cooperatively engaging in surface-to-surface relation the tapered portion 34 of the outer housing member 12, as shown in FIG. 6. The surface-to-surface engagement between the respective tapered surfaces 34 and 46 forms a sealed condition therebewteen and also acts to prevent the inner housing member 14 from passing through the aperture 20 and into a container on which the device is mounted. An O-ring groove 48 is formed in the outer surface 38 adjacent the first end portion 40, which O-ring groove 48 receives an O-ring 50 which compressably and sealably engages the inner surface 32 of the outer housing member to form a second, more flexible and resilient sealed condition around the aperture 20. Another annular groove 52 is located adjacent the second end portion 42 of the inner housing member in opposing and spaced relation to the annular groove 36 of the outer housing member 12. This groove 52 with the groove 36 on the outer housing member 12 forms an annular shaped channel or void 54 therebetween for receiving the fusible relief means 18, discussed next.

The fusible relief means 18 are preferably located in the annular channel 54 and include a fusible solder material or substance that, when in its solid state, forms a band or ring 56 which securely, yet releasably holds the inner housing member 14 in position on the outer housing member 12. The band or ring of solder 56 extends into the opposing annular grooves 36 and 52 to securely interlock the housing members together. The band 56 also maintains the tapered surfaces 34 and 46 in surface-to-surface engagement and maintains the sealed condition therebetween. Importantly, this sealed condition prevents the fusible solder substance which can contain lead and other toxic substances from contaminating the interior and contents of a container.

The band of solder 56 has a predetermined melting temperature. The location of the band of solder 56 adjacent the free end of the outer housing member 12 exposes the solder to atmosphere to enable it to react relatively rapidly to changes in atmospheric temperature, while temperature conditions in a container on which the device is mounted can be conducted to the solder through the device itself. The solder can include any suitable solder substance or alloy, the preferred fusible solder material being a eutectic solder alloy which melts at a very precise temperature. For instance, a solder of lead bismuth alloy having a melting temperature of 250° F. has been found satisfactory for many applications.

Figure 7:
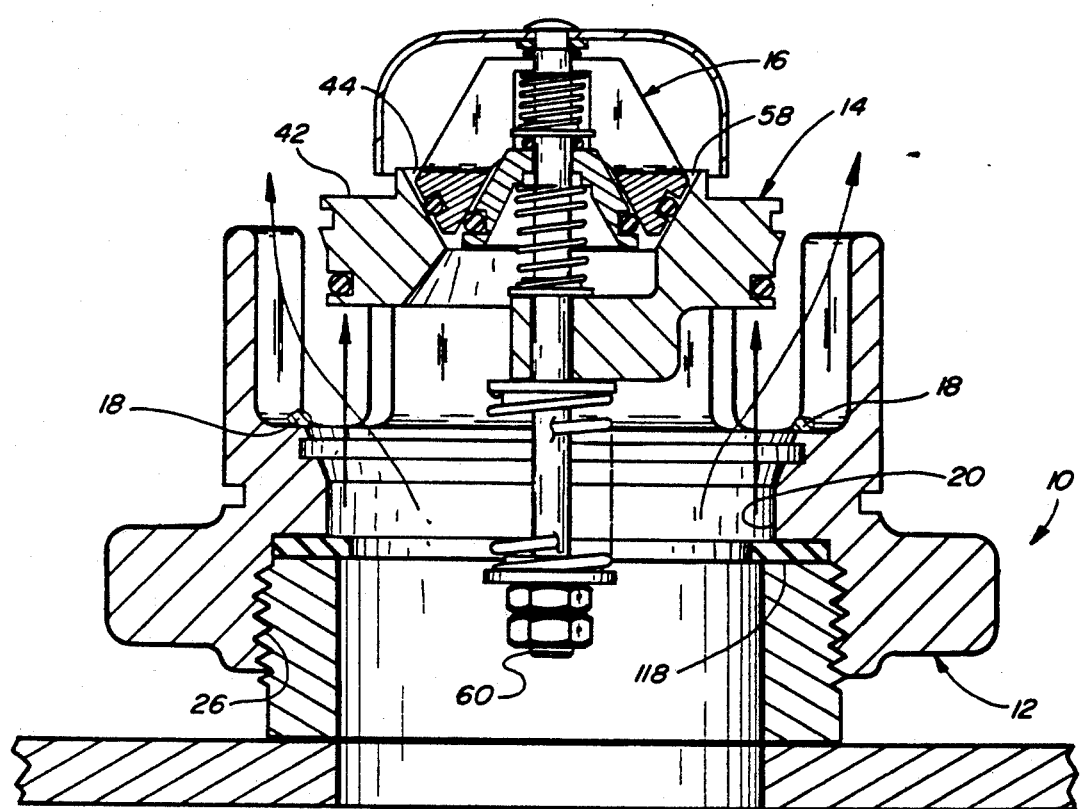
FIG. 7 is a cross-sectional view of the apparatus of FIG. 1 shown installed on a container and shown in the fusible pressure relief mode.
Figure 8:
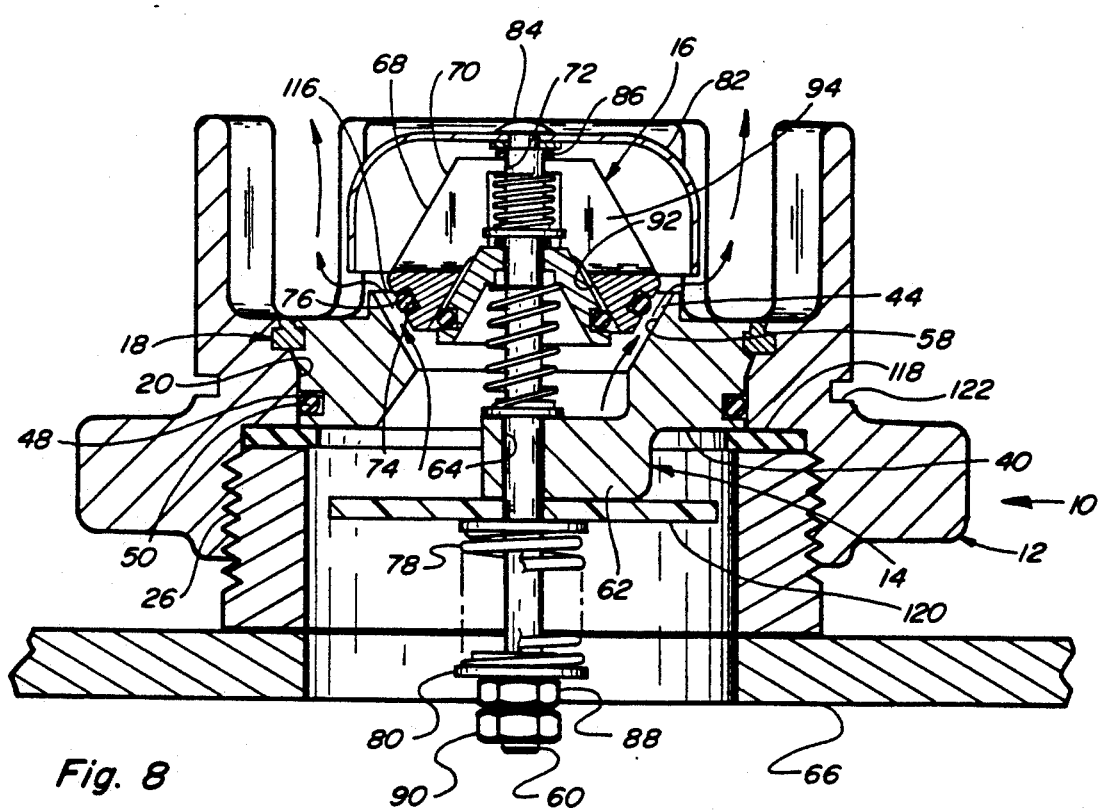
FIG. 8 is a cross-sectional view of the apparatus of FIG. 1 shown installed over a container opening and in the pressure relief mode.

When the band of solder 56 reaches its melting temperature, the solder melts and releases the inner housing member 14 from the outer housing member 12. The pressure in the container, such as the container 66 shown in FIG. 7, can then operate against the inner housing member 14 to separate and displace and even blow the inner housing member 14 away from the outer housing member 12. The amount of separation or displacement of the inner housing member 14 depends on the pressure in the container. For instance, low pressure may provide only relatively slight displacement whereas a high pressure build-up in a container can lift or blow the inner housing member 14 completely away from the inner housing member 12, as illustrated in FIG. 7.

Figures 9, 10, 11, 12:
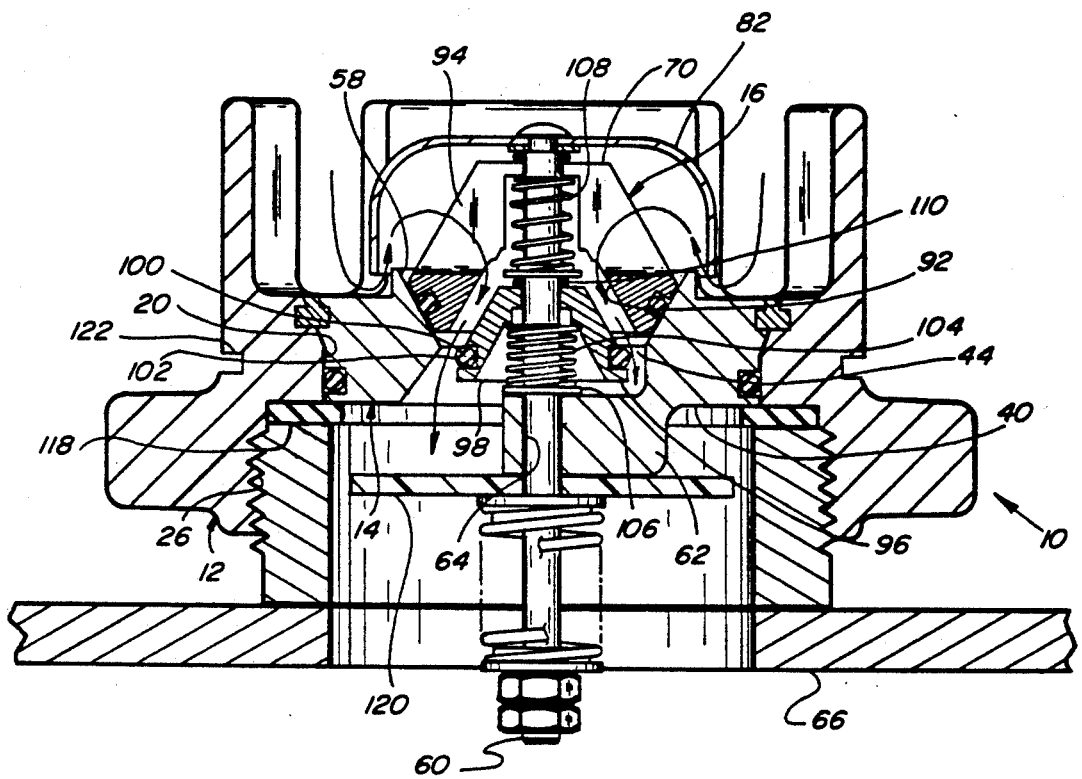
FIG. 9 is a cross-sectional view of the apparatus of FIG. 1 shown installed over a container opening and in the vacuum relief mode.
FIG. 10 is a top plan view of the pressure relief valve member of the apparatus of FIG. 1.
FIG. 11 is a cross-sectional view of the pressure relief valve member taken along line 11—11 of FIG. 10.
FIG. 12 is a cross-sectional view of the vacuum relief valve member employed in the apparatus of FIG. 1.

The combined pressure and vacuum relief means 16 are mounted on the inner housing member 14 in the passageway 44. The passageway 44 is open at both ends and has a centrally located longitudinal axis extending therethrough. The inner housing member 14 forms a valve seat 58 around the passageway 44 adjacent the second end portion 42. The passageway 44 provides a conduit for communicating pressure conditions inside of a container to the combined pressure and vacuum relief means 16 and also for the flow of air and the like into and out of a container on which the device is mounted. The combination pressure and vacuum relief means 16 include a shaft member 60 extending through the passageway 44 and the inner housing member 14. The shaft member 60 is supported by a shaft support or web portion 62 extending into the passageway 44 adjacent the first end portion 40, the web portion 62 having a longitudinal bore 64 which slidably receives the shaft member 60 to enable longitudinal movement thereof in the passageway. The combination pressure and vacuum relief means 16 have a closed condition, as shown in FIG. 1, which forms an airtight condition over the passageway 44. When the device 10 is mounted on a container such as shown at 66 in FIG. 8, and the pressure condition in the container reaches or exceeds a first predetermined threshold or set value, the pressure relief means will open such that the contents of the container can escape through the passageway 44. For vacuum relief, which occurs when the pressure inside of the container 66 is less than the ambient outside pressure by at least some predetermined amount, the vacuum relief portion of the combined relief means 16 will open the passageway 44 to enable the inflow of makeup air therethrough into the container, as shown in FIG. 9.

Referring again to FIG. 8, the combined pressure and vacuum relief means 16 include a pressure relief valve assembly 68. The pressure relief valve assembly 68 includes a pressure relief valve member 70 mounted on the shaft member 60 and movable therewith axially relative to the valve seat 58 on the inner housing member 14. The pressure relief valve member 70 has a bore 72 therethrough adjacent one end for receiving the shaft member 60 and also includes seal means, preferably an O-ring 74 located in an annular groove 76 adjacent the opposite end thereof, which O-ring 74 is cooperatively and sealably engageable with the valve seat 58 when the pressure valve assembly is closed. The pressure relief valve member 70 is biased toward the valve seat 58 by a spring 78 located on the shaft member 60 between the shaft support 62 and a washer 80. A cover member 82 preferably having a bell or cup shape is attached to the end of the shaft member 60 adjacent the pressure relief valve member 70 by peening as at 84 or by other suitable means and covers the combination pressure and vacuum relief means 16. The cover 82 is separated from the pressure relief valve member 70 by an O-ring 86 located around the shaft member 60 as shown. A compression nut 88 is threadedly attached to the opposite end of the shaft member 60 adjacent to the washer 80 and can be tightened or loosened as desired to adjust the compression on the spring 78. The internal container pressure at which the pressure relief valve assembly 68 opens can be determined by adjustment of the compression nut 88. A locknut 90 can be tightened against the compression nut 88 to maintain a particular adjustment.

The pressure relief valve member 70 is preferably a frusto-conical shaped member having an open end and an inner surface which forms an internal cavity 92. The valve member 70 forms a valve seat adjacent to one end of the internal cavity and includes a plurality of angularly spaced apertures or openings 94 extending therethrough and communicating with the cavity 92, as shown in FIGS. 10 and 11.

The combined pressure and vacuum relief means 16 include a vacuum relief valve assembly 96. The vacuum relief valve assembly 96 is located on the shaft member 60 and extends into the cavity 92 of the pressure relief valve member 70, as shown in FIG. 9. The vacuum relief valve assembly 96 includes a vacuum relief valve member 98 having seal means preferably including an O-ring 100 located in a groove 102 extending around the outer surface thereof as shown in FIG. 12, and which O-ring 100 cooperatively and sealably engages the internal surface of the pressure relief valve member 70 when the vacuum valve member 98 is in its closed position. The vacuum relief valve member 98 is axially movable along the shaft member 60 to engage and disengage the pressure relief valve member 70 for closing and opening a vacuum relief vent passage through the pressure relief valve member 70, as shown in FIG. 9. The vacuum relief valve member 98 is biased toward its closed position by a second spring 104 located on the shaft member 60 between the vacuum relief valve member 98 and a washer 106 adjacent the shaft support portion 62. The spring 104 is a compression spring which exerts its biasing force directly against the vacuum relief valve member 98 urging the O-ring 100 toward engagement with the pressure relief valve member 70.

The vacuum valve assembly 96 preferably also includes means for forming a sealed condition between the vacuum relief valve member 98 and the shaft member 60, which shaft seal includes a third spring member 108 located on the shaft member 60 in the cavity 92 of the pressure relief valve member 70. The third spring 108 operates in opposition to the spring 104 and against an O-ring 110 to form a sealed condition between the vacuum relief valve member 98 and the shaft member 60. Importantly, the second spring 104 exerts a greater force against the vacuum relief valve member 98 than does the spring third 108, the third spring 108 exerting sufficient force to maintain the O-ring 110 in contact with the vacuum relief valve member 98 as its moves axially along the shaft member 60 so as to maintain the airtight seal around the shaft member 60 and to reduce hysterisis in the movement of the vacuum relief valve member 98.

The vacuum relief valve member 98 is preferably a frusto-conical shaped member, as shown in FIG. 12, and is sized and shaped so as to be cooperatively receivable in the internal cavity 92 of the pressure relief valve member 70. An important feature of the vacuum relief valve assembly construction resides in the fact that the vacuum relief valve member 98 is able to be receivable in the internal cavity 92 of the pressure relief valve member 70, and yet is able to move out of engagement therewith to form a relatively large passage for the inflow of air as required.

The combination pressure and vacuum relief means 16 can be adjusted to open when the pressure in the container 66 reaches some predetermined first pressure and to likewise open again but in a different manner when the pressure in the container falls below some second predetermined negative pressure or vacuum condition. For instance, in the cargo and transportation tank industry, pressure activated valves must typically be able to limit the over pressure in a container to about 3.0 pounds per square inch gauge (P.S.I.G) and receed when pressure drops to 3.0 P.S.I.G. or below. The industry standard also typically requires in a vacuum relief or vent device a flow rate capacity of 750 standard cubic feet per hour (S.C.F.H.) at 1.0 P.S.I.G. The combination relief means 16 are able to be made and adjusted to meet both of these requirements.

The combination pressure and vacuum relief means 16 are therefore able to relieve excess pressure in a container and if necessary are able to establish a relatively large opening or passageway for the pressure in a container to be relieved. This is an important feature because it enables pressure to be relieved in a relatively rapid manner so as not to cause damage to the container or to the present device. The combination pressure and vacuum relief means 16 can further be configured for venting and relieving at other pressure and vacuum or partial vacuum conditions by the selection of appropriately sized components thereof including the springs. The pressure relief valve member 70 and the vacuum relief valve member 98 can have a variety of shapes for the outer surfaces and internal cavities thereof such as being made as segments of spheres, parabloids, eliptoids and other curved shapes.

The fusible relief means 18 constructed according to the preferred embodiment and including the above-described lead bismuth eutectic solder material releases the inner housing assembly at 250° F. and provides a pressure relief flow rate of 110,000 cubic feet per hour at 5 P.S.I.G. Such temperature actuated pressure relief capability meets typical industry standards for storage tanks so as to prevent damage to the tank such as rupture thereof, and damage to other equipment and the danger of explosion due to excessive pressure build-up in the container. Also, importantly, the fusible means 18 can be constructed so as to meet other industry standards for various other applications as desired.

The device 10 is adaptable for use in a variety of applications in the transportation, chemical, materials handling and other industries. The outer housing member 12 can have a wide variety of shapes and sizes and can include other mounting means as an alternative to the threaded means 26; which alternative mounting means can correspond to those of a wide variety of container covers and caps. The components of the device can be fabricated from a variety of materials such as stainless steel and other materials, and the fusible means can comprise various solder alloys and substances required to provide a desired relief temperture or for use in a particular environment or with a particular container content. Furthermore, the fusible means can be formed in alternative shapes and sizes, such as one or more dowel members which wedge or otherwise releasably secure the inner housing member on the outer housing member. The inner housing assembly including the releasable inner housing member and the combined pressure and vacuum relief means can have other shapes and sizes and configurations, and can alternatively include only pressure relief means or only vacuum relief means alone.

The present device 10 can include additional features such as opposing ears or tabs 112 on the outer housing member 12, which ears 112 are cooperatively engageable by a spanner wrench or other tool in the usual manner for mounting or installing a cap or cover on a container and which ears 112 are sufficiently sturdy for receiving hammer blows and other abuse. The outer housing member 12 can include one or more prominences 114 extending outwardly from adjacent the free end 24 thereof adjacent the combined pressure and vacuum relief means 16 for protecting the relief means from damaging contact such as from fork lifts and falling tanks. The prominences 114 are preferably spacedly related to provide openings therebetween to drain and prevent accumulation of liquid such as rain water or the like on the device 10. The inner housing member 14 preferably includes a raised lip or flange 116 on the outside thereof around the open end of the passage 44 for preventing dust, rain water and other contaminants which may collect on the device from entering the passageway 44. The device 10 can also include seal means such as a gasket or washer 118 adjacent the mounting means 26 for forming a sealed condition around a container opening. Furthermore, shock and vibration dampening means such as a resilient or rubbery baffle or pad 120 can be located between the shaft support web 62 and the spring member 78 and at other locations, as desired to provide shock dampening for the pressure and vacuum relief means. The device 10 can be tethered to a container using means such as a chain, a cable, or a cord (not shown) which can be attached around the device 10 in an annular groove 122 on the outer housing member 12 or elsewhere to prevent the loss or misplacement of the device when removed from the container opening.

Thus there has been shown and described novel means for combining in a single structure pressure, vacuum, and fusible relief means which fulfills all the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only the claims which follow.

What is claimed is:

1. A combination relief vent apparatus for installing on a container having an opening therein comprising;
    a first member having an aperture therethrough and means for mounting on a container with said aperture in communication with a container opening,
    a second member located in said aperture and exposed to the pressure conditions in the container through the container opening, fusible means located between said first member and second member, said fusible means maintaining a sealed condition around said second member and maintaining said second member in said aperture, said fusible means melting at a predetermined temperature to allow pressure in the container acting against said second member to separate said second member from said first member and escape from the container therebetween, said second member having a passageway extending therethrough and through said aperture, and
    relief valve means mounted on said second member and closing said passageway, said relief valve means operating to open said passageway in response to a predetermined pressure condition in the container.

2. The apparatus according to claim 1 wherein said predetermined pressure condition is a positive pressure condition.

3. The apparatus according to claim 1 wherein said predetermined pressure condition is a negative pressure condition.

4. The apparatus according to claim 1 further comprising means on said first member and on said second member preventing the passage of said second member through said passageway.

5. The apparatus according to claim 1 further comprising means preventing communication through said aperture between said fusible means and the container opening.

6. The apparatus according to claim 1 wherein said fusible means form an annular band extending around said second member.

7. The apparatus according to claim 1 wherein said fusible means comprise a plurality of dowel shaped members.

8. The apparatus according to claim 1 wherein said fusible means comprise a eutectic solder material.

9. The apparatus according to claim 8 wherein said eutectic solder material is a lead bismuth alloy having a melting temperature of about 250° F.

10. The apparatus according to claim 1 further comprising an O-ring mounted on said second member and forming a sealed condition with said first member.

11. Apparatus for installing over an opening on a container comprising;
   an outer housing member having an aperture therethrough and means for mounting on a container with said aperture in communication with a container opening,
   an inner housing member located in said aperture and exposed to the pressure conditions in the container through the container opening, fusible means located between said inner housing member and said outer housing member, said fusible means forming a sealed condition around said inner housing member and maintaining said inner housing member in said aperture, said fusible means melting at a predetermined temperature to allow pressure in the container acting against said inner housing member to separate said inner housing member from said outer housing member and escape from the container therebetween, said inner housing member having a passageway extending therethrough and through said aperture, and
   combination relief valve means mounted on said inner housing member and closing said passageway, said combination relief valve means operating to open said passageway in response to a first predetermined pressure condition in the container which is greater than the pressure outside of the container, said combination relief valve means operating to open said passageway in response to a second predetermined pressure condition in the container which is less than the pressure outside of the container.

12. The apparatus according to claim 11 wherein said fusible means comprise a eutectic solder material.

13. The apparatus according to claim 11 further comprising means preventing communication through said aperture between said fusible means and the container opening when said inner housing member is mounted in said aperture.

14. The apparatus according to claim 11 further comprising tapered surfaces on said inner housing member cooperatively engageable with tapered surfaces on said outer housing member for mounting said inner housing member in said aperture.

15. A combination relief vent apparatus for installing over an opening on a container comprising;
   an outer housing member having first and second opposite ends, an aperture extending therethrough and means adjacent said first end for mounting on a container with said aperture in communication with the container opening,
   an inner housing member mounted in said aperture adjacent to the second end of said outer housing member, fusible means located between said outer housing member and said inner housing member, said fusible means maintaining said inner housing member in position in said aperture below a predetermined temperature, said fusible means melting when the temperature reaches or exceeds said predetermined temperature to allow pressure in the container to separate said inner housing member from said outer housing member and escape from the container therebetween, said inner housing member having a passageway extending therethrough and through said aperture, and
   pressure relief means located in said passageway and vacuum relief means located in said passageway adjacent to said pressure relief means, said pressure relief means and said vacuum relief means acting in concert to close said passageway through said inner housing member when the pressure condition in the container is below a first predetermined pressure and above a second predetermined pressure, said pressure relief means operating to open in response to the pressure in the container reaching or exceeding said first predetermined pressure to allow pressure to escape from the container through the passageway, said vacuum relief means operating to open in response to the pressure in the container decreasing to or falling below the second predetermined pressure to allow ambient air to enter the container through the passageway.

16. Means for relieving excessively high pressure and excessively low pressure and providing temperature actuated pressure relief for a container having an opening thereon comprising;
   an outer housing member having opposite open end portions and an aperture extending therebetween, a first of said opposite end portions including means for installing on a container with said aperture in position over the opening thereon,
   an inner housing member mounted in the aperture of said outer housing member, said inner housing member having a side exposed to the pressure in the container through said aperture,
   at least one fusible member located between said outer housing member and said inner housing member and maintaining said inner housing member in said aperture when said fusible member is below a predetermined temperature, said fusible member melting at said predetermined temperature to allow pressure in the container acting against the side of said inner housing member exposed thereto to separate said inner housing member from said outer housing member and escape from the container therebetween, said inner housing member having a passageway extending therethrough and forming a valve seat around said passageway, and
   a combination valve assembly mounted on the inner housing member, said combination valve assembly operating to close said passageway when the pressure in the container is below a first predetermined pressure and above a second predetermined pressure, said combination valve assembly including pressure relief means which open in response to the pressure in the container reaching or exceeding said first predetermined pressure to allow pressure to escape from the container through the passageway and vacuum relief means which open in response to the pressure in the container decreasing to or falling below the second predetermined pressure to allow ambient air to enter the container through the passageway.

17. The means according to claim 16 wherein said fusible member is a ring shaped member.

18. The means according to claim 16 wherein said at least one fusible member comprises a plurality of dowel shaped members.

* * * * *